United States Patent [19]
Ohgomori et al.

[11] Patent Number: 5,109,487
[45] Date of Patent: Apr. 28, 1992

[54] SYSTEM AND METHOD FOR DISTRIBUTED DATA PROCESSING UTILIZING DISTRIBUTED DISPLAY FORMAT

[75] Inventors: Seizi Ohgomori, Funabashi; Hiroshi Tsukino, Kawasaki; Ryoichi Nakazato, Ebina, all of Japan

[73] Assignees: Hitachi, Ltd.; Hitachi Computer Consultant Ltd., both of Tokyo, Japan

[21] Appl. No.: 260,745

[22] Filed: Oct. 21, 1988

[30] Foreign Application Priority Data

Oct. 21, 1987 [JP] Japan .................. 62-263826

[51] Int. Cl.$^5$ .............................................. G06F 3/153
[52] U.S. Cl. ............................... 395/200; 395/148; 364/931.43; 364/942.03; 364/956.1; 364/967.1; 364/947.7; 364/943.44; 364/975.1
[58] Field of Search ............... 364/900, 200, 518, 403, 364/401, 406; 395/148

[56] References Cited

U.S. PATENT DOCUMENTS

| | | | |
|---|---|---|---|
| 4,053,871 | 10/1977 | Vidalin et al. | 364/900 |
| 4,141,078 | 2/1979 | Bridges, Jr. et al. | 364/403 |
| 4,432,057 | 2/1984 | Daniell et al. | 364/200 |
| 4,477,881 | 10/1984 | Kobayashi et al. | 364/900 |
| 4,525,803 | 6/1985 | Vidalin et al. | 364/900 |
| 4,608,662 | 8/1986 | Watanabe et al. | 364/900 |
| 4,751,635 | 6/1988 | Kret | 364/200 |
| 4,783,740 | 11/1988 | Ishizawa et al. | 364/403 |
| 4,870,611 | 9/1989 | Martin et al. | 364/900 |
| 4,881,197 | 11/1989 | Fischer | 364/900 |
| 4,887,204 | 12/1989 | Johnson et al. | 364/200 |
| 4,888,726 | 12/1989 | Struger et al. | 364/200 |
| 4,907,188 | 3/1990 | Suzuki et al. | 364/900 |
| 4,912,669 | 3/1990 | Iwamoto et al. | 364/900 |
| 4,941,091 | 7/1990 | Breault et al. | 364/406 |

*Primary Examiner*—Michael R. Fleming
*Assistant Examiner*—Ayaz R. Sheikh
*Attorney, Agent, or Firm*—Pennie & Edmonds

[57] ABSTRACT

A data distribution processing system and a data distribution processing method in the system including a data processor having a memory capable of separately storing data display formats and corresponding data and a plurality of terminals each having a memory capable of storing data display formats. The data processor beforehand stores the data display formats and delivers the display formats to one of the terminals for storage in that terminal's memory. The data processor sends, in response to a request for data associated with the data display format from the terminal, data related to the data display format in the processor's memory to the terminal requesting the data. The terminal sends, in response to an entered specification of a data display format, a request for data associated with that data display format to the data processor, reads the data display format from its own memory together with the data sent form the data processor in response to the request. The terminal then displays a combined image. Also in the terminal, in response to the display, data is manually inputted and is then sent to the data processor so as to be stored in the processor's memory.

17 Claims, 13 Drawing Sheets

CREATION AND REGISTRATION OF SLIP FORMATS, PRINT FORMATS, AND PROOF MARK DATA

DELIVERY OF SLIP

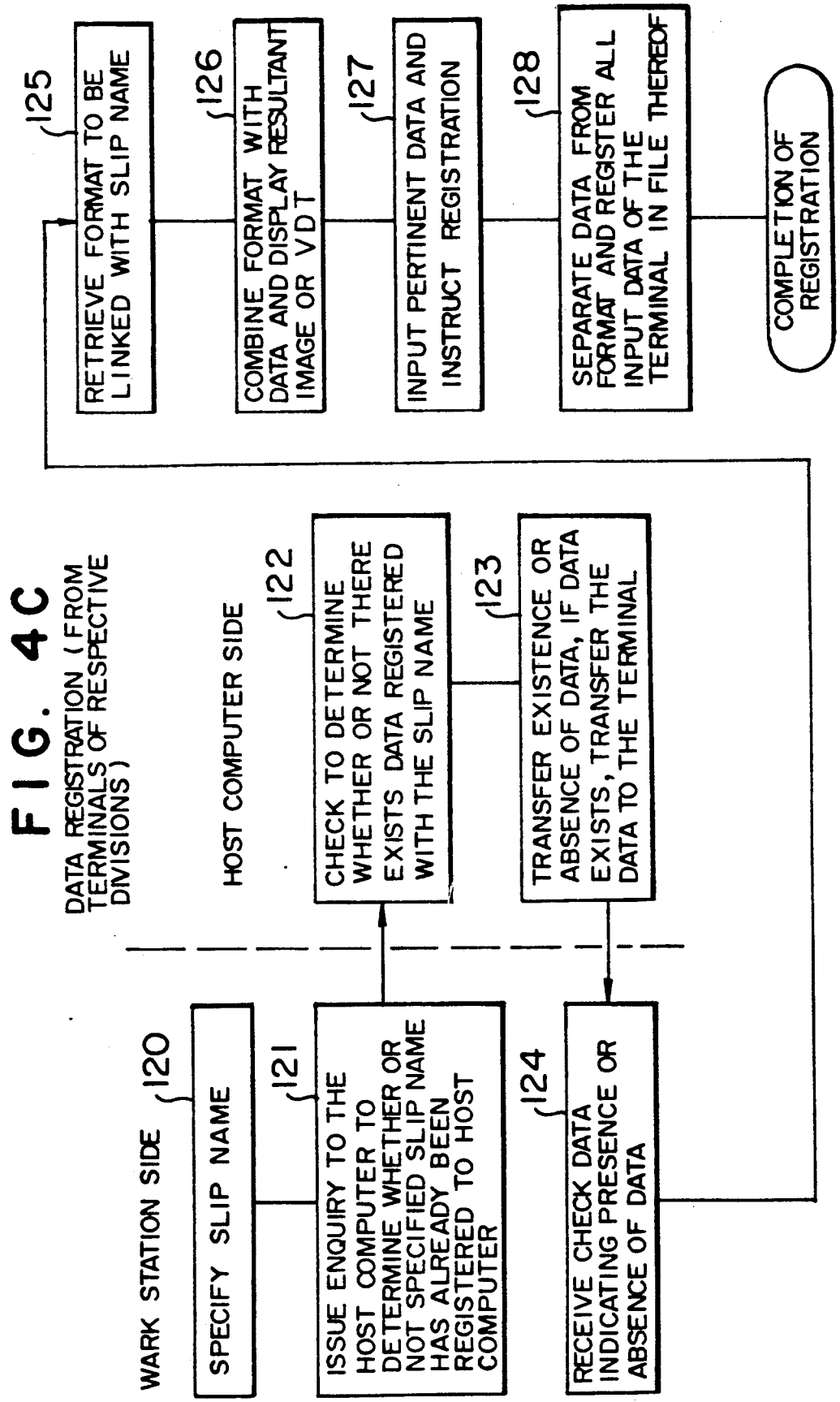

DATA COLLECTION

APPROVAL PROCESSING

PRINT PROCESSING

FIG. 5A

| SLIP FORMAT NO. | |
|---|---|
| ADDR | |
| REGISTRATION DIVISION | |
| REGISTRATION DATE | |
| LATEST UPDATE DATE | |
| LATEST DELIVERY DATE | |

DETAILS SLIP FORMAT CONTROL
TABLE ON HOST COMPUTER SIDE

FIG. 5B

| SLIP NAME | |  |
|---|---|---|
| ADDR | | |
| REGISTRATION DATE FOR SPERIFIC REGISTRATION DIVISION | DIVISION NAME | REGISTRATION DATE |
| LATEST UPDATE DATE FOR SPERIFIC REGISTRATION DIVISION | DIVISION NAME | UPDATE DATE |
| APPROVAL DATE | | |
| APPROVER ID | | |

DETAILS OF SLIP DATA
CONTROL TABLE ON HOST COMPUTER SIDE

FIG. 5C

| PROOF MARK CODE | |
|---|---|
| ADDR | |
| REGISTRATION DATE | |
| LATEST UPDATE DATE | |

DETAILS OF PROOF MARK DATA CONTROL TABLE
ON HOST COMPUTER SIDE

FIG. 5D

| FORMAT | SLIP FORMAT NO. | |
| --- | --- | --- |
| | ADDR | |
| | DELIVERY DATE | |
| DATA | SLIP NAME | |
| | ADDR | |
| | REGISTRATION DATE | |
| | LATEST UPDATE DATE | |
| PROOF MARK | PROOF MARK CODE | |
| | ADDR | |
| | REGISTRATION DATE | |
| | LATEST UPDATE DETE | |
| | | |

DETAILS OF CONTROL TABLE OF TEMINAL 2a(2n)

FIG. 5E

| FORMAT | SLIP FORMAT NO. | |
| --- | --- | --- |
| | ADDR | |
| | DELIVERY DATE | |
| DATA | SLIP NAME | |
| | ADDR | |
| | REGISTRATION DATE | |
| | LATEST UPDATE DATE | |
| | | |

DETAILS OF CONTROL TABLE OF TERMINAL

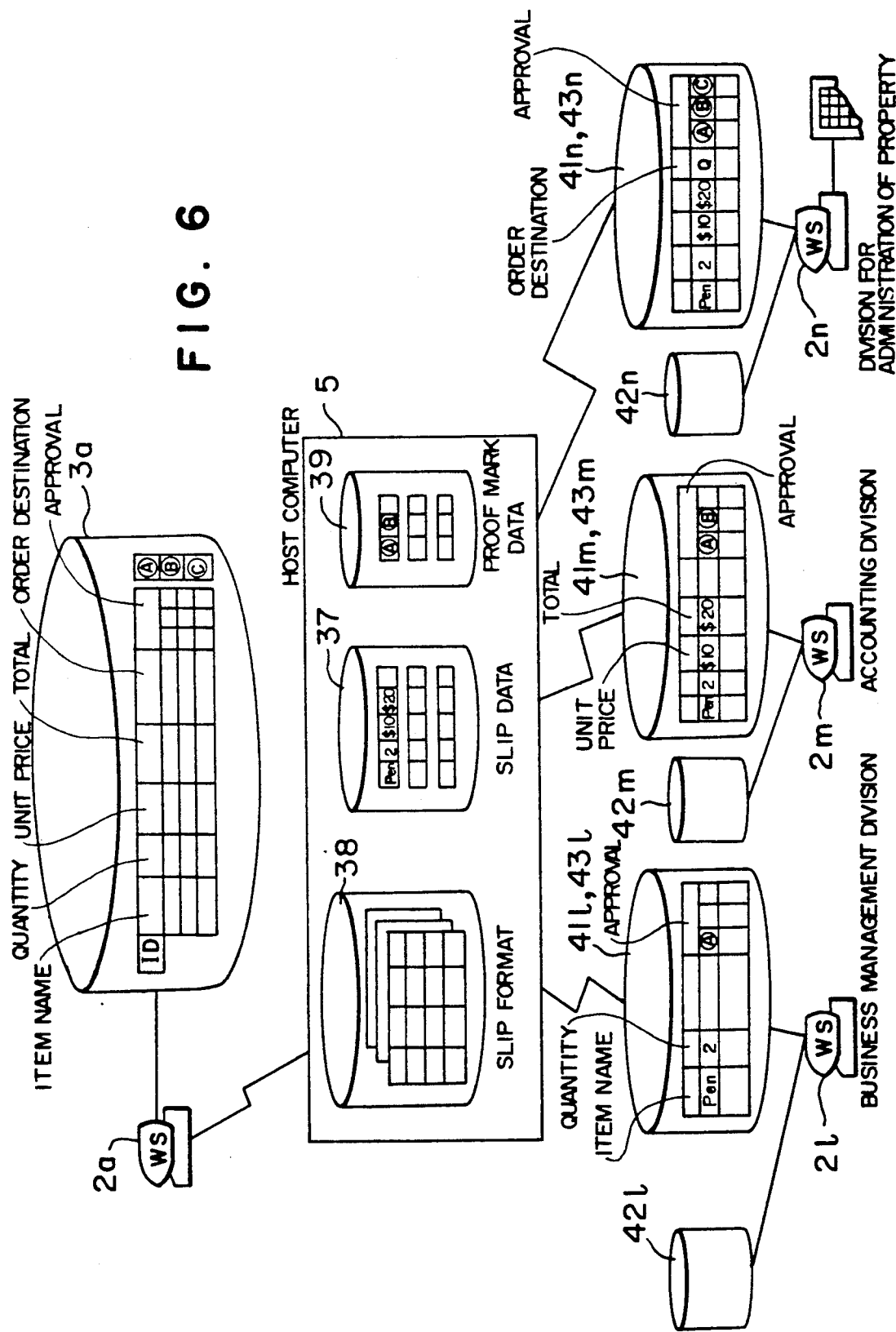

SYSTEM AND METHOD FOR DISTRIBUTED DATA PROCESSING UTILIZING DISTRIBUTED DISPLAY FORMAT

BACKGROUND OF THE INVENTION

The present invention relates to a data distribution processing system for effecting registration and transfer operations of data between terminals based on predetermined data display formats, and in particular, to a data distribution processing system and a job distribution processing method suitable when the utilization efficiency of communication lines and the operability for the user are taken into consideration.

Conventionally, in an example of a data distribution processing system, there is used an electronic mail system already put to use in various fields so as to establish respective functions based thereon; however, the data display formats and data are not separately treated in the processing; moreover, in some systems, when a terminal transfers data not registered thereto to a communicating terminal, the registration data of the terminal is also transferred thereto together with the data.

Of those related to this kind of system, reference is to be made to, for example, JP-A-61-25347.

However, the conventional method above is attended with problems as follows.

That is, in a circulation system of electronic slips or forms in which a data display format, for example, a slip is circulated through a plurality of sections or divisions via a host computer such that in each division, data is registered to an entry field assigned thereto and then the slip is passed to the next division in the circulation, the data items thus registered in the respective divisions are circulated together with the format; as a result, the transmission efficiency is deteriorated for the following reasons. That is, the amount of data inputted from such divisions is increased through the circulation; furthermore, at a registration thereof to a mail box and at a takeout thereof from the mail box, the same format and the same data are repeatedly communicated between the host computer and terminals, which leads to a problem that the over all transmission efficiency is lowered in the entire system.

On the other hand, JP-A-58-80758 describes an electronic mail system between distributed processors in which three components including job or business data, data display formats, and programs for generating data, documents, and graphs are separately stored in each distributed processor so as to effect the transmission and reception thereof.

In this system, a central processor is disposed between the distributed processors such that the mails from the respective distributed processors are temporarily stored in the central processor.

In this system, however, the data registered in each distributed processor is circulated together with the format and hence the transmission efficiency is deteriorated.

In addition, the central processor is adopted only as a relay device for effecting the mailing operation between the distributed processors, namely, this method is similar to the conventional data transfer method employed for the data transfer between a plurality of distributed processors.

SUMMARY OF THE INVENTION

It is therefore an object of the present invention to provide a data distribution processing system and a data distribution processing method capable of increasing the transmission efficiency and of developing a satisfactory operability for the user, thereby solving the problems of the conventional method.

In order to achieve the object above, according to the present invention, there is provided a data distribution processing system in which data is written in predetermined data display formats between a plurality of terminals via a data processor (a host computer) wherein each said terminal includes a memory to store the data display formats, said host computer has a memory to separately control the data display formats and data, said host computer storing in advance the data display formats in the memory and also transfers the data display formats to the memories of the respective terminals. In this configuration, when the user specifies from a terminal a name of a data display format as an object of processing, the data display format corresponding thereto stored in the memory of the terminal and data related to the data display format and stored in the memory of the host computer are read out so as to be displayed on the terminal. With this provision, data written in the data display format by a user of another terminal and a field of the data display format to be filled in by the user of the pertinent terminal can be known.

Thereafter, at the terminal, data is written in the field thus determined and then the data is transmitted to the host computer so as to be stored in the memory thereof. In consequence, the input data from the respective terminals are totally stored in the memory of the host computer. In this manner, since the data display formats are stored in the host computer and each terminal, only the data is subjected to the information transfer between the terminals and the host computer, which leads to an improvement of the information transmission efficiency. Moreover, even when a failure takes place in a terminal, the data display formats can be transmitted again from the host computer to the terminal. In other words, the memory on the host computer side can function as a backup system of the memory of the terminal.

In addition, since the data display formats are stored beforehand in the host computer and the respective terminals, the formats need not be transferred each time data is transmitted, which also increases the information transmission efficiency.

BRIEF DESCRIPTION OF THE DRAWINGS

The present invention will be apparent from the following detailed description taken in conjunction with the accompanying drawings in which:

FIGS. 4A to 4F are flowcharts showing processing procedures in the embodiment according to the present invention;

FIGS. 5A to 5E are schematic diagrams showing detailed items of the control tables in the embodiment according to the present invention;

FIG. 6 is a block diagram schematically showing a configuration of the control tables in the embodiment according to the present invention;

DESCRIPTION OF THE PREFERRED EMBODIMENTS

Figure 1:
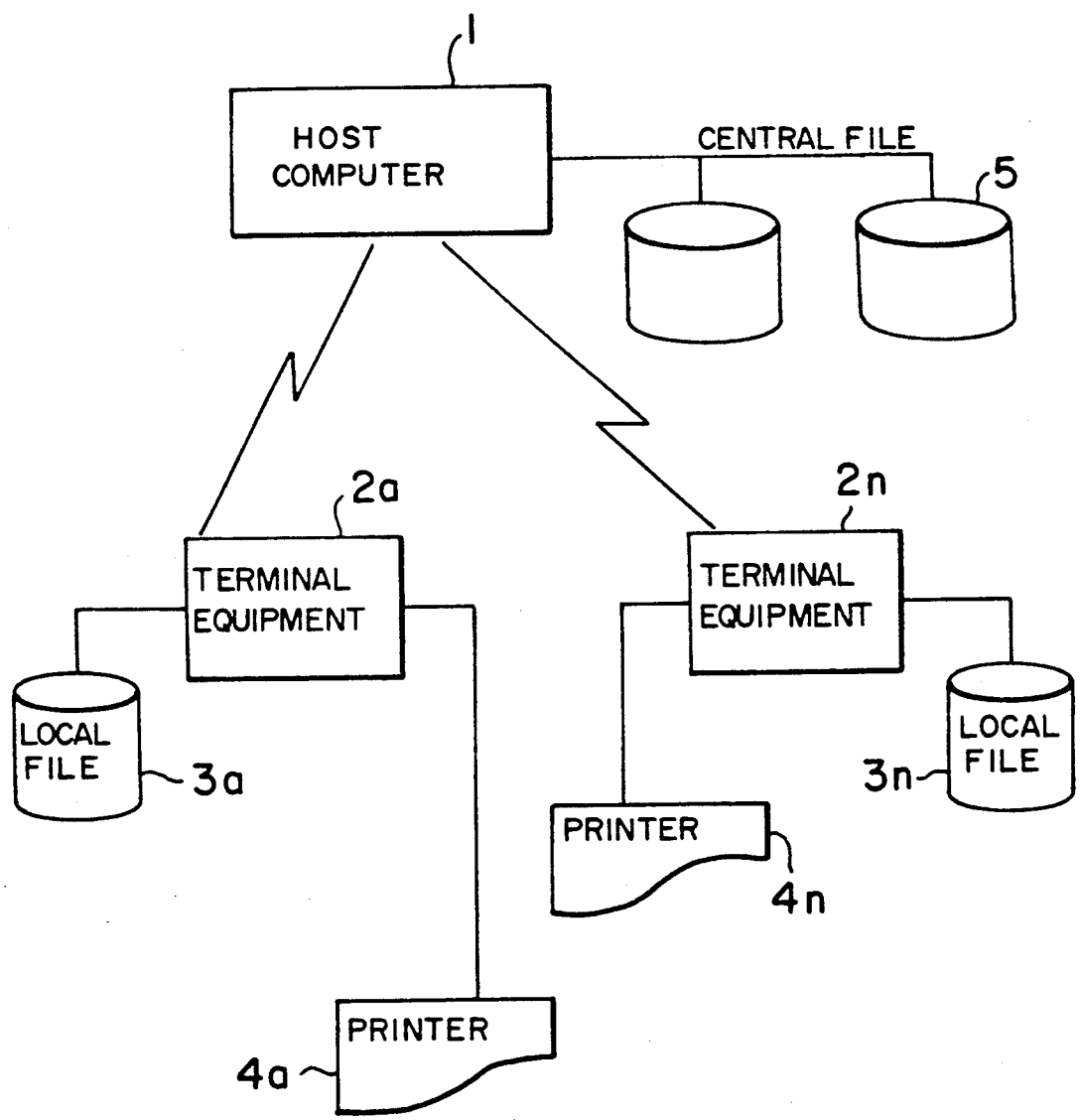
FIG. 1 is a block diagram showing a schematic configuration of an embodiment of the data distribution processing system according to the present invention.

Referring now to the drawings, description will be given of embodiments of a data distribution processing system and a data distribution processing method according to the present invention.

Although the embodiments will be described in using a case where a slip or form (an electric slip) is employed as an example of the data display format, the present invention is not restricted by the slip and is applicable, for example, to various data display formats such as an examination sheet in a clinic and a memo sheet of experiment data.

FIG. 1 is a block diagram showing a configuration of an embodiment of a data distribution processing system according to the present invention.

Figure 2:
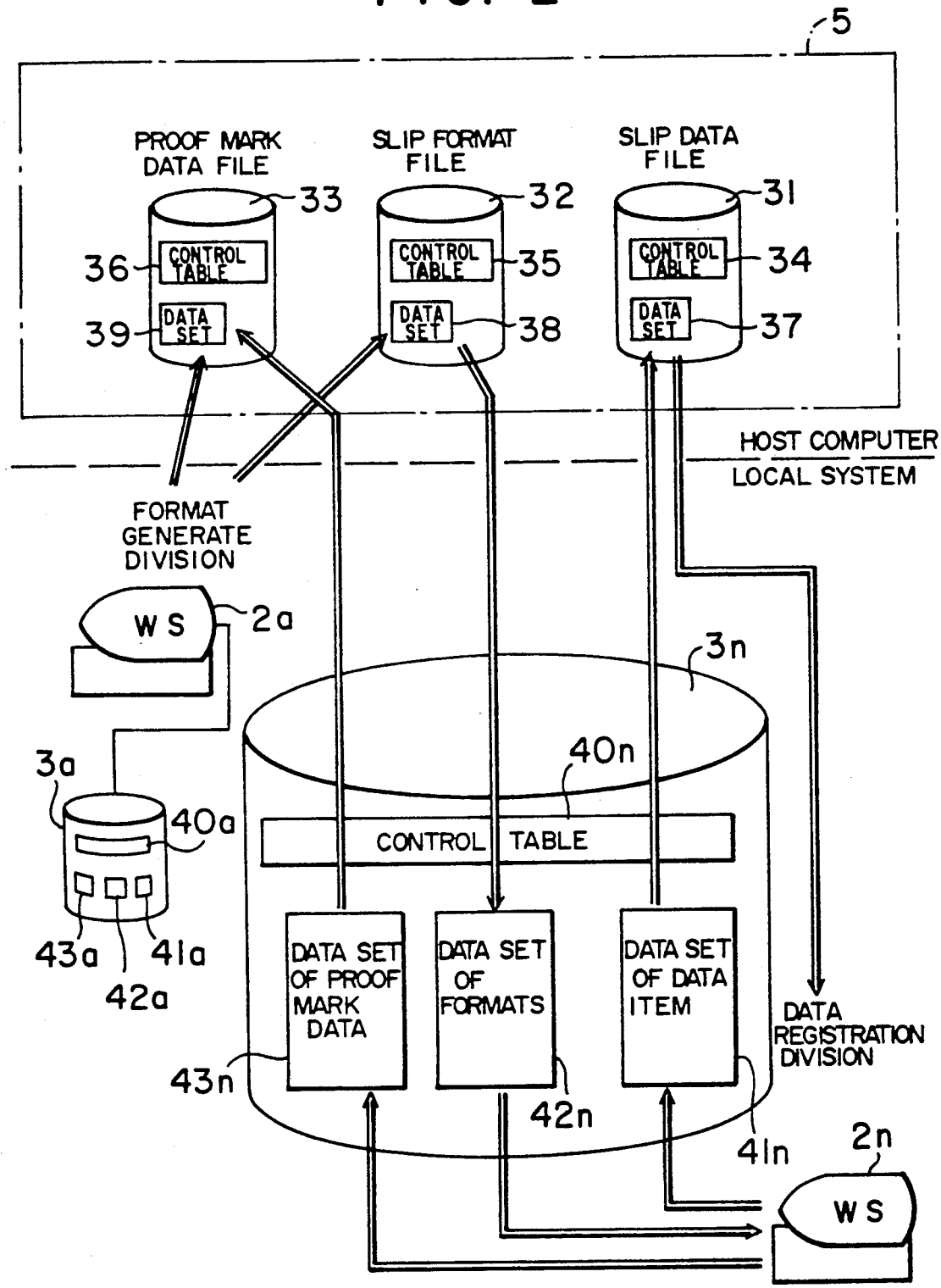
FIG. 2 is a schematic diagram showing relationships between control tables and data in the host computer and terminals.

FIG. 2 is a schematic diagram showing relationships between various control tables and entities of data associated with the data distribution processing system according to the present invention.

Figure 3:
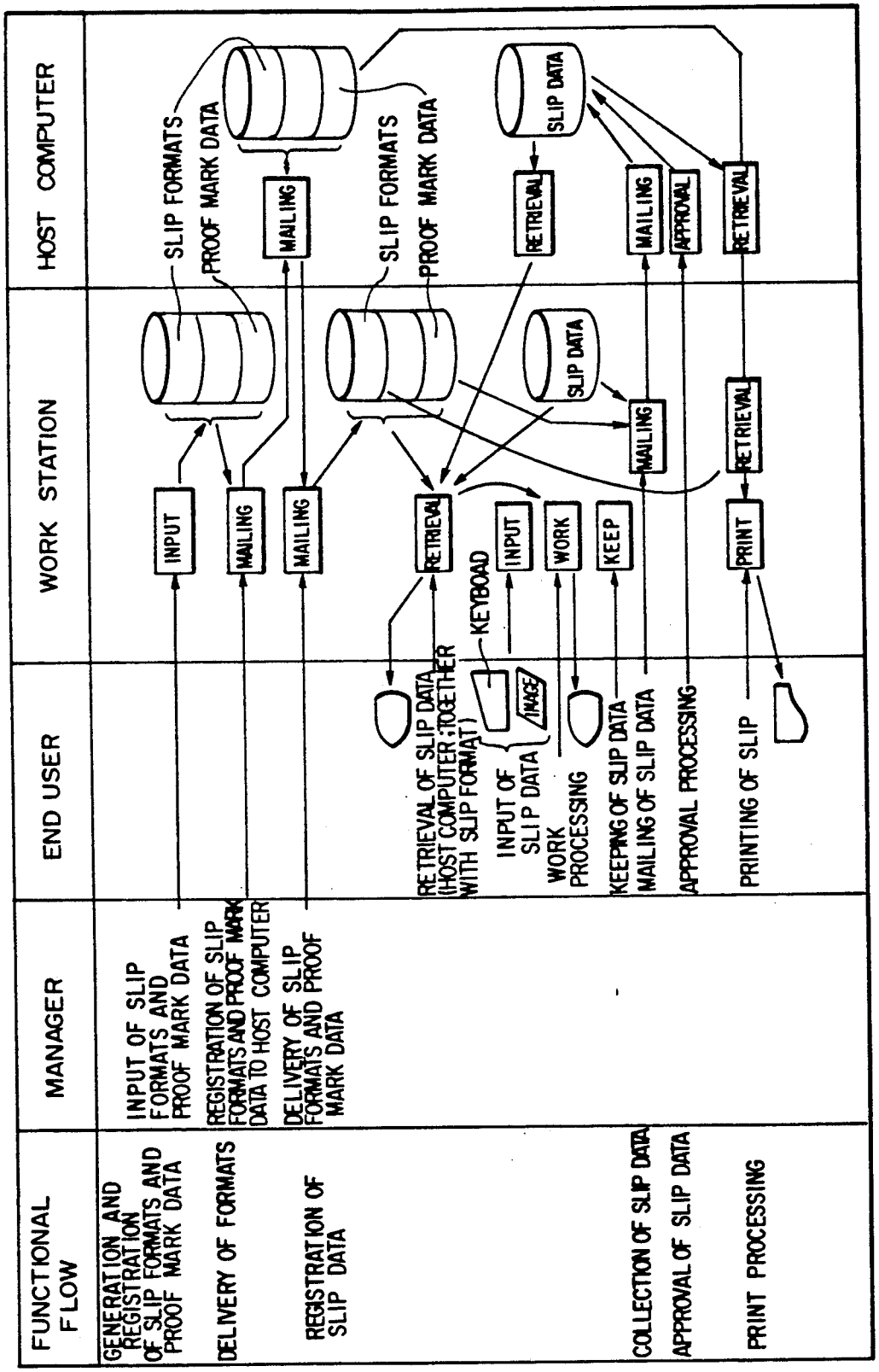
FIG. 3 is an explanatory diagram useful to explain processing functions in the embodiment according to the present invention.

FIG. 3 is a schematic diagram showing processing functions in an embodiment according to the present invention, FIGS. 4A to 4F are flowcharts showing processing procedures employed in the embodiment of FIG. 3 in which each function of FIG. 3 is represented in detail.

FIGS. 5A to 5E are detailed control table diagrams showing in detail the control tables disposed in the host computer and the terminals of FIG. 1.

Referring now to FIG. 1, description will be given of the system configuration diagram of an embodiment according to the present invention.

In this configuration, a host computer 1 has a function to mail or collect and distribute electronic slips and is connected to a central file 5 in which formats of the electronic slips and data filled in the electronic slips are stored. A plurality of terminals or work stations (WS) 2a to 2n are connected to the host computer 1 such that issuance of an electronic slip, reference thereto, and entry of data to an electronic slip format are achieved at each terminal. For simplicity, only the terminals 2a and 2n are shown in FIGS. 1 and 2. The respective terminals are disposed with local files 3a to 3n connected thereto. Such terminals are installed, for example, in organization divisions related to the slips such as a division for administration of property, an accounting section, and a business management department of a firm.

FIG. 2 shows information items stored in the central file 5 and the local files 3a to 3n. The central file 5 includes a slip data file 31 for storing data filled in the slips, a slip format file 32 for storing formats of the slips, and a proof mark data file 33 for storing proof mark data to be added to the slips. These files 31 to 33 are associated with control tables 34 to 36 for controlling storage states of the respective data items and data sets 37 to 39 for storing the data items. On the other hand, each local file, for example, the local file 3n comprises a control table 40n, data set 41n of data filled in the slips, a data set 42n associated with slip formats, and a data set 43n concerning proof mark data.

The electronic slip processing accomplished in the system above will now be briefly described with reference to FIG. 3.

For a new slip first introduced in the processing system, it is necessary to create and register a slip format, a print format, and a proof mark data item and to deliver these formats to the host computer and the terminals. The processing above is effected through an operation of a system manager. For example, the manager inputs these data items to the work station 2a. The data thus inputted is stored in the local file 3a of the pertinent work station 2a and is further delivered to the central file 5 of the host computer 1 according to an instruction from the manager. In addition, in accordance with an instruction from the manager to the host computer 1, the information items stored in the central file 5 are delivered to the local files associated with other work stations.

Based on an operation conducted by a user or a worker handling the slip in a section (at a work station), the processing is achieved as follows: For registration of the slip data, when a slip name is first specified from a work station, a slip format corresponding to the slip name is attempted to be retrieved from local files of the work station, which then reads out the specified slip format from a pertinent local file. Also, an enquiry is issued to the host computer 1 to determine whether or not data related to the slip name has already been registered to the central file 5. In response to the enquiry, the host computer 1 attempts to retrieve the data. If the data is found, the host computer 1 sends the data to the work station. In the work station, the slip format and the data from the central file 5 are displayed in a combined form such that the operator inputs slip data based on the display thus attained. The slip data includes character data and image data. When an instruction is inputted to keep the slip data, the slip data thus inputted is stored in a local file of the work station.

Next, the mailing or the collection and delivery of the slip data will be described. When the mail processing of the slip data is instructed from a work station, the slip data inputted from the pertinent work station and stored in the local file 5 associated with the work station is registered to the central file 5 on the side of the host computer 1, which enables the slip data to be referenced from other work station.

Print processing of the slip data will be achieved as follows. In response to an instruction of a slip print operation from a work station, the pertinent work station reads out the slip format specified as an object of the print processing from the local file 3 of the pertinent work station and issues a request to the host computer 1 to transfer the slip data and the proof mark data from the central file 5, thereby combining these data items and printing the combined data.

For a slip issued from a section, when a slip data item is filled in an entry field of the section, the slip is then referenced by the next section concerning the slip so as to input slip data in an entry field associated therewith. According to the method of the present invention, the slip data items additionally filled in a slip through the respective sections or divisions are accumulated in the central file 5 of the host computer 1. Although the accumulated data is transmitted from the host computer 1 to the terminals, the transmission of the data is not carried out in the reverse direction. Namely, only the slip data inputted from the terminals are transmitted to the host computer 1 therefrom. The slip formats are controlled separately from the slip data and are delivered in an initial stage of the processing from the host computer 1 to each terminal, and thereafter, the processing of the slip formats is not conducted. A terminal is supplied from the host computer 1 with information items enabling a window of the latest state to be displayed on the terminal, namely, all data items of the slip. On the other hand, the host computer 1 is supplied from the terminal with information enabling the slip data in the latest state to be kept in the host computer 1, namely, only the slip data inputted from the terminal. In consequence, the slip format is not circulated through the divisions and sections related to the slip, namely, the slip format is read from the file at the respective terminal for the reproduction thereof.

Next, the embodiment will be described in detail with reference to the flowcharts of FIGS. 4A to 4F, the control tables of FIG. 5, and the configuration diagram of FIG. 6.

Figure 4A:
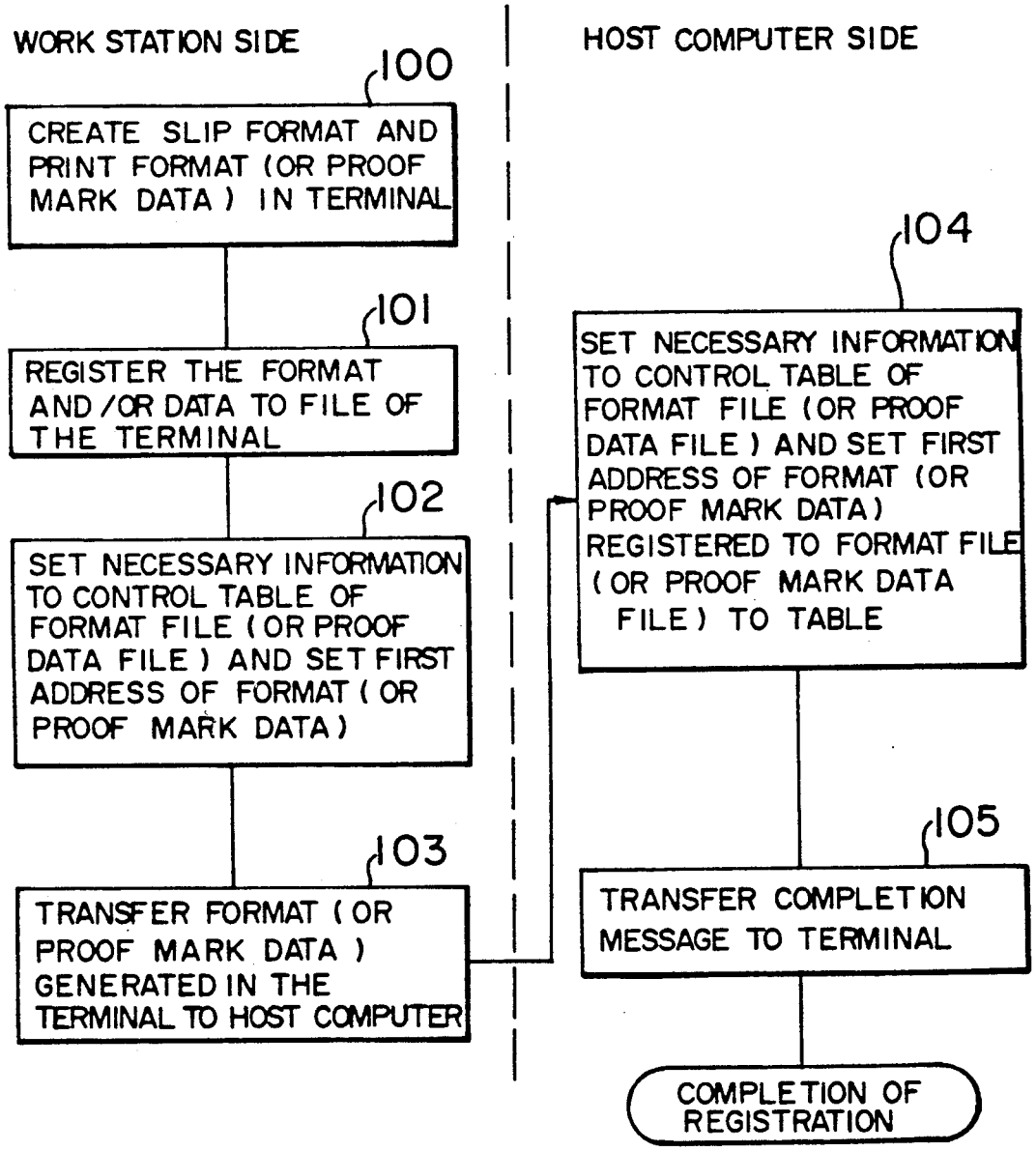

First, a slip format, a print format, and proof data are generated and registered as shown in the flowchart of FIG. 4A. Here, the slip format indicates a slip form displayed on a terminal when the slip data is registered from the terminal. The print format is a format employed to convert data etc. displayed on a VDT of a terminal into data of a format to be printed on a sheet of paper. Consequently, when the data conversion is unnecessary, the print format is not required. In addition, the proof mark data means a proof mark to be simultaneously outputted when the data approved is printed on a form. The slip format, the display format, and the proof mark data are generated at a terminal, for example, the terminal 2a in a division controlling the issuance of the slip (step 100).

In this description, an order slip of the file 3a of FIG. 6 is employed as an example of the slip format. For the order slip of FIG. 6, an item name and the quantity thereof are filled in at the terminal 2% of the business management division, for example. At the same time, a proof mark Ⓐ is inserted. Thereafter, at the terminal 2m of the accounting division, the unit price of the item and the total amount are filled in and a proof mark Ⓑ is stumped; furthermore, at the terminal 2n of the division for administration of property, the destination of the order and a proof mark Ⓒ is stumped, thereby printing the order slip to be passed to the order destination. In consequence, proof mark data includes Ⓐ, Ⓑ, and Ⓒ in this case.

Furthermore, a simple computation formula can also be incorporated in the slip format such that there is developed a function in which when data is inputted, a computation is automatically conducted to display the result of the computation in the pertinent column.

In other words, for example, when data indicating the quantity is inputted from the terminal 2n of the accounting division, an entry of the total amount is automatically effected.

After the step 100 is finished, the slip format, the print format, and the proof mark data are registered to the file 3a of the own terminal 2a (step 101).

The slip format, the print format, and the proof mark data thus registered are controlled, for each slip format, in the form of a list of FIG. 5D by use of the control table 40a in the local file 3a. Incidentally, the print format is omitted in FIG. 5D, namely, in the list of FIG. 5D, a slip format number (for example, No. 1 in a case of the order slip), the first address (ADDR) of the data set 42a in which the pertinent slip format (order slip) is stored, the first address of the data set 43a in which the proof mark code and the proof mark associated therewith are stored, the latest registration data of the proof mark, etc. are set, thereby establishing relationships between entity of the data items and the control tables (step 102).

When the registration to the file 3a of the terminal 2a is thus achieved, the slip format, the print format, and the proof mark data are simultaneously transferred to the host computer (step 103).

In the host computer, in order to register the slip format, the print format, and the proof mark data thus received, necessary information items are set to the control tables. As shown in FIG. 5A, for each slip format, a list is disposed in the control table 34 so as to be loaded with, in addition to the slip format number and the first address of a storage area of the data set 38 storing the slip format, the registration division, the registration data, etc. In addition, for the proof mark data, as shown in FIG. 5C, a list is disposed for each proof data so as to store therein the first address of the data set 39 storing the proof mark data, the registration data, etc., thereby establishing relationships between the data items and the respective control tables (step 104).

The host computer returns a message indicating that the registration to the host computer has been completed to the terminal 2a (step 105), thereby finishing the creation and registration processing of the formats and the proof mark data.

Figure 4B:
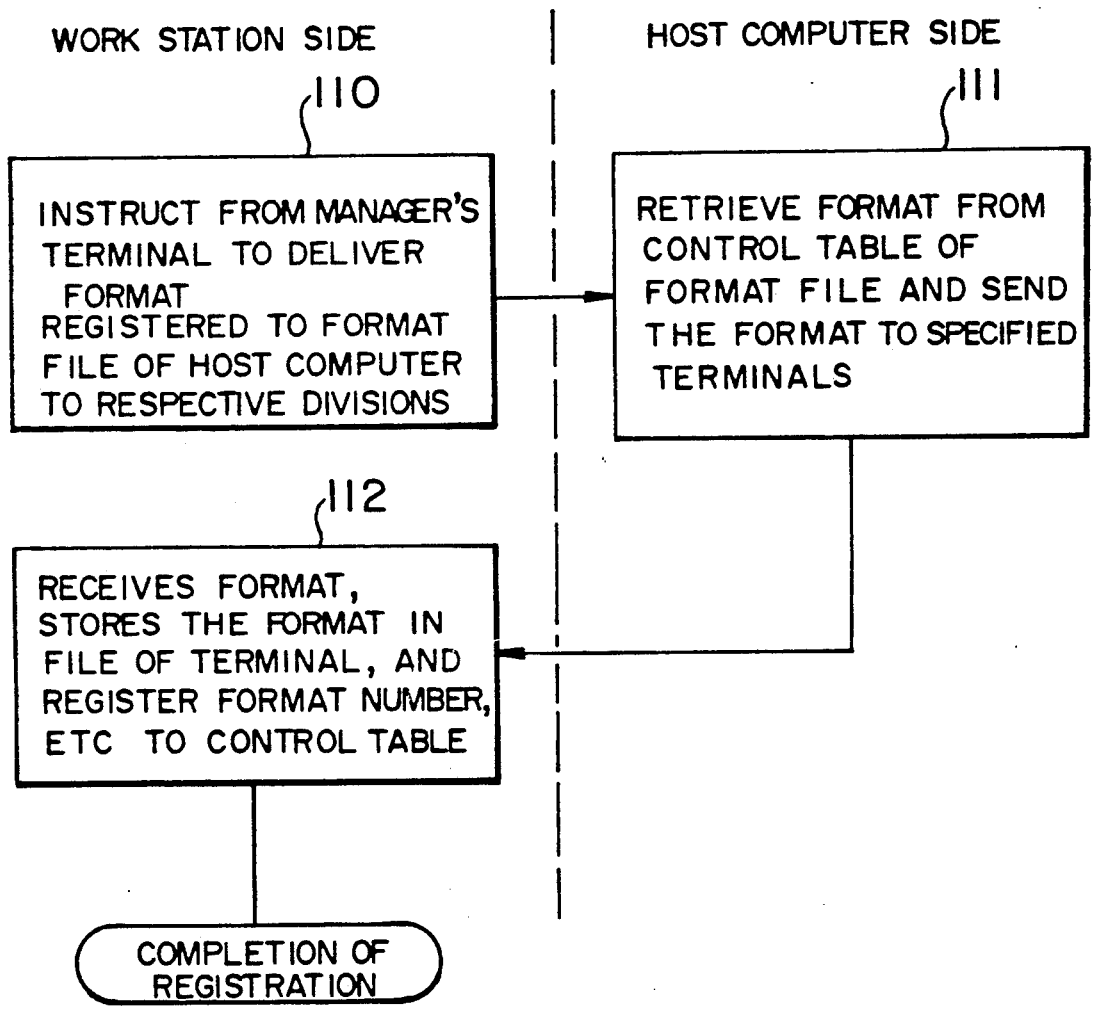
Figure 4D:
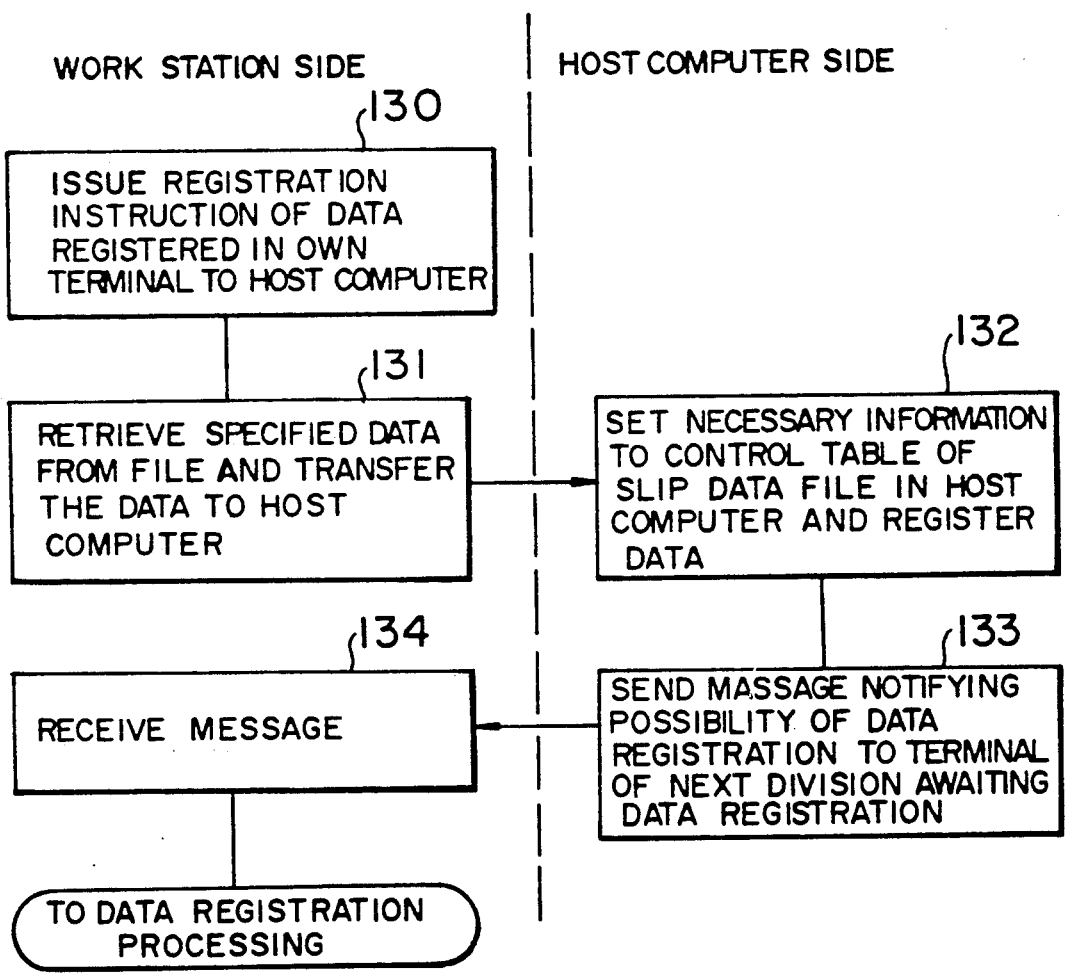
Figure 4E:
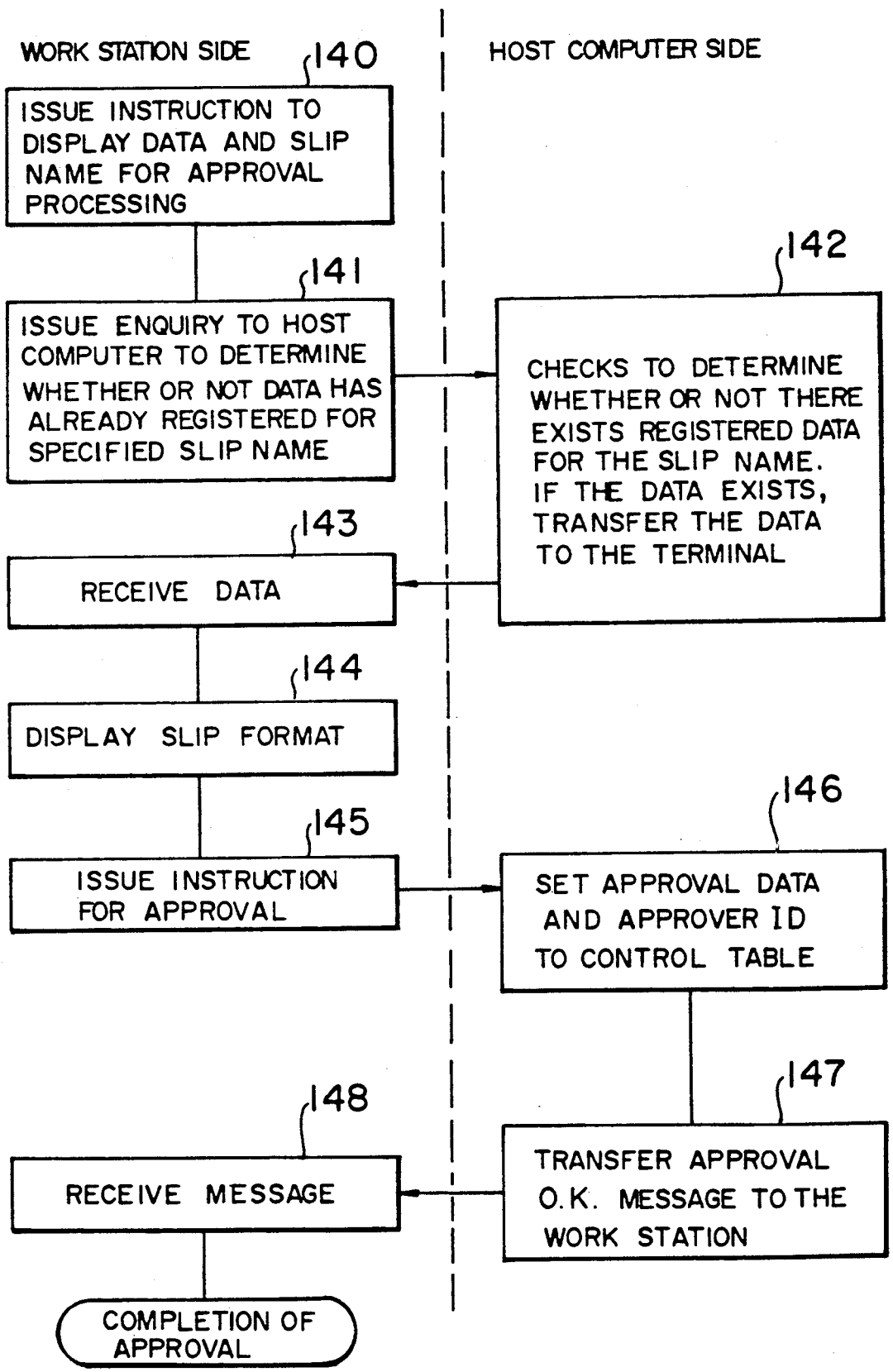
Figure 4F:
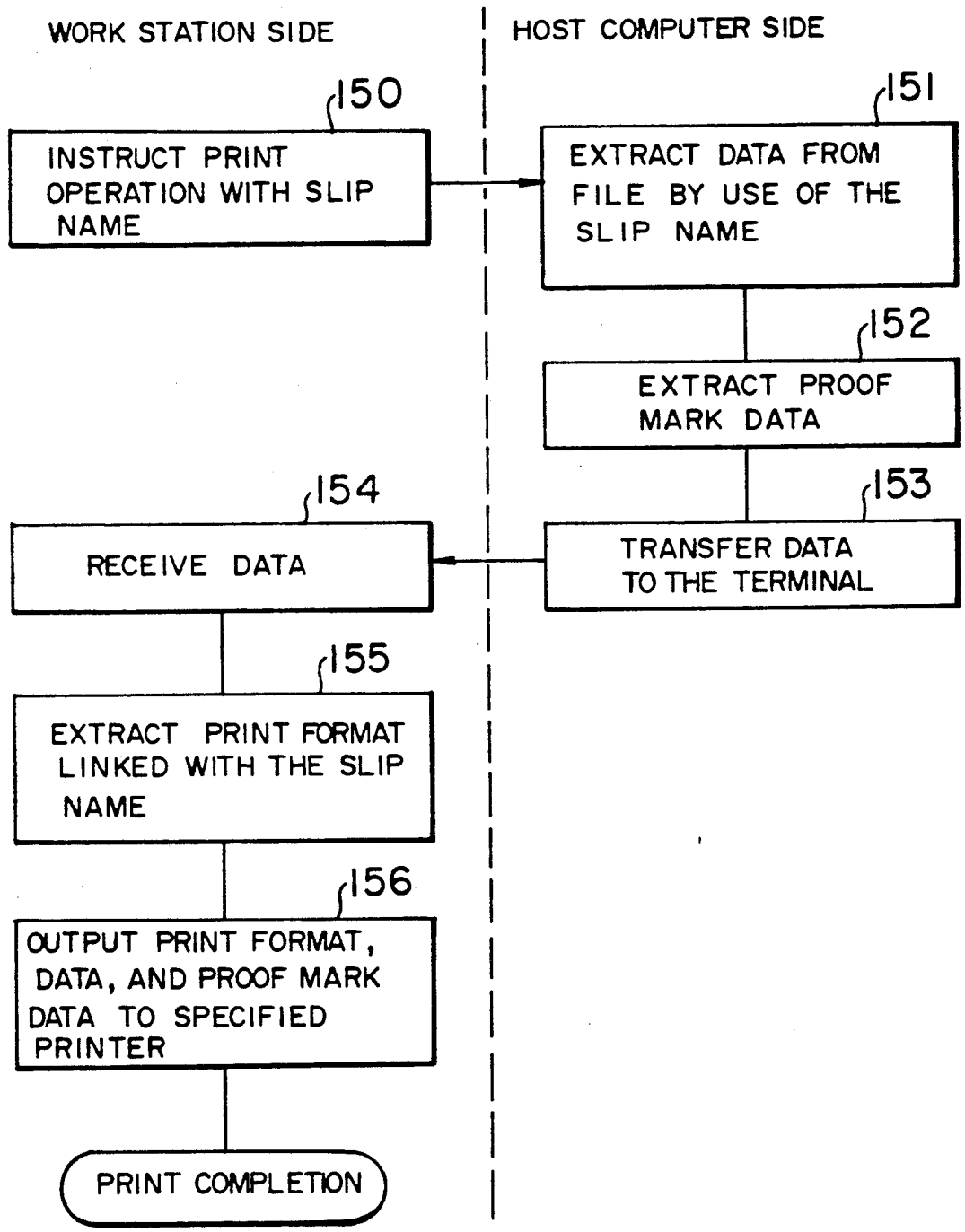

Subsequently, the delivery processing of the slip formats is carried out as shown in FIG. 4B. The manager of the formats instructs from the terminal 2a to the host computer to transfer the pertinent slip and print formats registered to the format file 32 of the host computer to the divisions concerned (step 110). The print format need only be sent, for example, to the terminal 2n (FIG. 6) in which the print processing is to be achieved. In this situation, the transfer start time can be instructed such that, for example, a period of the night time when the line utilization rate is low is specified so as to increase the overall transmission efficiency in the entire system. On receiving the transfer instruction, the host computer attempts to retrieve the specified slip and print formats from the slip format file 32 to transfer the obtained slip and print formats to the terminals of the specified divisions (step 111).

The terminal of the division then receives the formats transferred from the host computer, stores the format in the format data set 41, and sets necessary information as shown in FIG. 5D to the control table 40 of the pertinent file associated with the terminal, thereby setting the first address of the registered format (step 112). As a result, the registered format is linked with the control table and the delivery processing of the slip is completed.

When the processing above is finished, each terminal effects the registration processing of the slip data. In the following description, as shown in FIG. 6, for example, three terminals 2l, 2m, and 2n are employed to register data to an order slip as an example of the slip format.

First, as shown in FIG. 4C, the user specifies a slip name necessary for the data registration from the own terminal (step 120).

That is, for example, an order slip is specified from the terminal 2*l* of the business management division. In response thereto, an enquiry is issued to the host computer to determine whether or not data from another division has already been registered to the host computer (step 121). On receiving the enquiry, the host computer attempts to retrieve slip data associated with the slip name (order slip) so as to determine whether or not the data has been registered to the data set 37 (step 122). The host computer then transfers the result of the retrieval, namely, whether or not the data has been registered; moreover, when the data has been registered, the data is transferred to the terminal 2*l* (step 123).

On receiving the notification from the host computer, the terminal 2*l* checks the message thus received so as to also receive the data if the data has been registered (step 124).

The terminal 2*l* then searches the contents of the control table 40*l* associated with the own terminal to retrieve a slip format linked with the slip name specified from the terminal 2*l* (step 125) and displays the slip format and the data from the host computer in a combined form on a VDT of the terminal (step 126).

The user of the terminal 2( then inputs data items assigned thereto and issues a registration instruction (step 127).

That is, in the terminal 2*l*, for example, Pen and 2 are inputted in the columns of the order slip assigned to the item name and the quantity, and then a registration instruction is issued therefrom. In the pertinent terminal, on receiving the instruction, the data is separated from the format such that the new data inputted from the own terminal is registered to the control tables 40*l* and 41*l* (step 128), thereby completing the registration processing.

The registration processing above is carried out in the respective terminals 2*l*, 2*m*, and 2*n*. In the terminal 2*m*, for example, $10 and $20 are filled in the columns of the order slip assigned to the unit price and the total amount. Similarly, in the terminal 2*n*, for example, Q Co., Ltd. is inputted in the column of the order destination.

In this fashion, when the registration processing of the slip data items is finished, the mail processing of the slip data items to the host computer is achieved.

From the user (terminal), an instruction is issued to register slip data items registered in the respective terminal to the host computer (step 130). The pertinent terminal then reads the specified slip data from a data set of the file associated with the user and then transfers the data to the host computer (step 131). On receiving the data thus transferred, the host computer stores the received slip data in the data set 37 and sets the necessary information items, namely, the data address, the registration division, the registration date to the control table 34 having the slip name (that is, the order slip) associated with the slip data so as to register and to control the data together with the data of the other divisions (step 132). In this manner, when the data mailing operation initiated from the terminal 2*l* is finished, in order to allow a terminal, for example, the terminal 2*m* of the next division waiting for a data registration to conduct the data registration, a message indicating that the data registration is possible is sent to the terminal 2*m* (step 133). On receiving the message, the terminal 2*m* of the next division awaiting the data registration notifies the condition, for example, through the DVT to the pertinent worker or operator (step 134), thereby completing the data mail processing.

Next, the approval processing of the slip data will be described. The worker in charge of the approval inputs a slip name from a terminal to determine whether or not all data items necessary for the pertinent slip have already been inputted from the specific divisions and sections, and if this is the case, whether or not the inputted items are correct is determined (step 140). The terminal then issues an enquiry related to the specified slip name to the host computer so as to determine whether or not the data registration has already been effected (step 141). On receiving the enquiry, the host computer checks to determine whether or not there exist data items registered with the specified slip name. If this is the case, the host computer reads all such data items from the data set 37 and transfers the data items to the terminal issuing the enquiry (step 142). In response to the reception of the data (step 143), the terminal retrieves from a file of the own terminal a slip format (for example, the order slip) associated with the specified slip name and then displays on the terminal the retrieved format and the data from the host computer in a combined form (step 144). The operator in charge of the approval then checks the displayed data and issues an approval instruction if the data is correct (step 145). On receiving the approval instruction, the host computer sets the approval information items such as an approval date and an approval operator identification (ID) to the control table 34 associated with the slip name (order slip) (step 146).

In this situation, the approval operator identification may be identical to the proof mark code. In addition, a data protection is effected by setting the approval information items, namely, the data is prevented from being approved by a user other than the worker in charge of the approval. The host computer sends to the terminal a message indicating the completion of the approval processing (step 147) so as to supply the worker with the message through the VDT (step 148), thereby completing the approval processing.

The approval processing may be achieved prior to the registration of all data items to the slip or may be simultaneously effected when the data registration processing of the steps 145 to 148 is conducted in a data registration at a terminal.

Next, the print processing will be described. This processing is used, for example, in a case where the created slips are printed out so as to pass or entrust the printed slips to an external firm. A division requesting the slip print operation inputs from a terminal a slip name and a print instruction (step 150). On receiving the data and the instruction, the host computer extracts from the data set 37 all slip data items related to the slip name (step 151) and retrieves the approval worker identification associates with the slip name from the control table 34 such that based on the approval worker identification (proof mark code), the proof mark data is obtained from the data set 39 via the control table 36 (step 152).

The extracted slip data and proof mark data are transferred to the pertinent terminal (step 153).

On receiving the data (step 154), the terminal retrieves from the data set 42 of the own terminal a print format related to the slip name (step 155) so as to output the print format, the slip data, and the proof mark data to the specified printer (step 156), thereby completing the print processing.

In consequence, for example, in FIG. 6, after the format and the proof mark data are completely registered to the host computer and each terminal, if data is filled in, from the terminal 2*l*, in the columns of the order slip assigned to the item name and the quantity and then the input data is checked and is approved, the data as well as the approval instruction are transferred and are set to the host computer. Similarly, in the terminal 2*m*, the data registered in the terminal 2*l* is caused to be displayed on the VDT of the own terminal so as to fill in data items in the pertinent columns (associated with the unit price and the total amount) of the order slip and issues an approval thereto, thereby transferring the data and the approval instruction to the host computer. In addition, similarly, in the terminal 2*n*, data is inputted to the order destination column and approves the entry.

When the data registration is thus completed, the data of the order slip is printed out in response to a print instruction, for example, from the terminal 2*n*.

In the description above, the proof mark data is not stored in the terminals 2*l*, 2*m*, and 2*n*, and hence the control table associated with these terminals will become to be as shown in FIG. 5E. It is naturally possible to store the proof mark data only in a terminal (for example, the terminal 2*n*) effecting the print processing such that in the transfer processing of the step 153, the proof mark code is transferred in place of the proof mark data such that the proof mark data is read out in the terminal 2*n*.

Figure 7A:
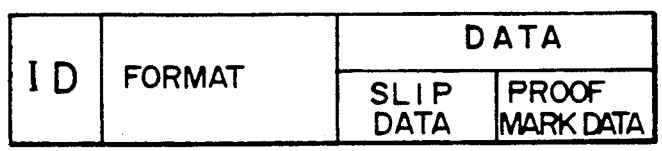
FIGS. 7A and 7B are diagrams showing information item communicated between the host computer and terminals according to the prior art technology and the present invention, respectively.
Figure 7B:
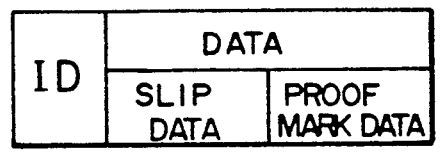

FIG. 7B shows the contents of transmission information between the host computer and terminals in the data registration, the data collection, the approval processing, and the print processing above, namely, only the identifier (ID) designating a slip name (a slip format numer) and data (slip data or proof mark data) are transmitted. In consequence, the slip format, which is included in the transmission information items of the conventional system as shown in FIG. 7A, need not be transmitted.

According to this embodiment, since the formats and data are separately kept in the host computer and the terminals, if the formats are once transferred to the respective terminals in advance when the communication lines between the terminals and the host computer are free, the processing such as the data registration, the data collection, etc. can be accomplished only by communicating data therebetween, which increases the transmission efficiency. In addition, the formats as well as data can be controlled by the host computer in a centralized fashion, namely, the control thereof is facilitated. Moreover, in the data registration section, data inputted from the other sections and divisions can be referenced without considering the files associated with the host computer and the terminals. In addition, in concurrence with the processing to register data of the own division to the host computer, a message to allow or to request the next division to effect a data registration operation can be automatically transmitted to the next division, stagnation or delay of the processing of slips and forms is satisfactory prevented.

That is, for example, in FIG. 6, when a data registration is carried out in the terminal 2*l*, a message allowing or requesting a data registration is automatically sent to the terminal 2*n*. Furthermore, according to a method in which after slip data is temporarily stored in a file on the terminal side during a slip data registration, a registration insturction of the slip data is issued to the host computer such that the slip data is registered to a file on the host computer side, since the data is automatically registered to both files disposed on the own terminal side and the host computer side through a registration processing, the operator effecting the data registration need not consider the data registration on the terminal side and the host computer side, which hence improves the operability. In addition, since the registration of the formats to both files disposed on the terminal and host computer sides through an operation, the operability is also improved for the format manager.

Furthermore, when using the existing electronic mail system, if a higher priority is assigned to a message outputted from the host computer (for example, a message requesting an operation to the next division awaiting a data registration), it is guaranteed that the message is transmitted at a high speed to the destination (the message is not cleared until the message is referenced by the terminal of the destination).

Figure 8:
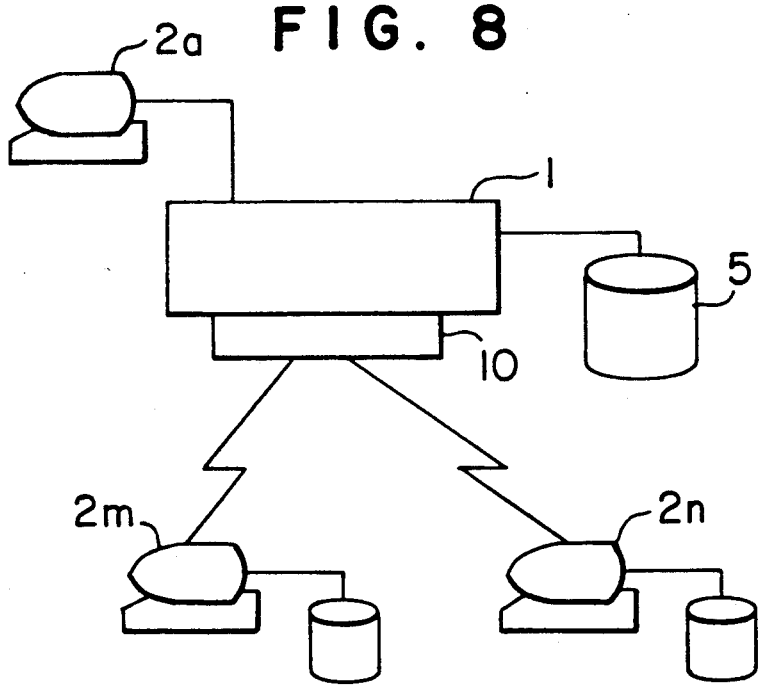
FIGS. 8 and 9 are schematic configuration diagrams respectively showing alternative embodiments according to the present invention.

That is, for this purpose, like the system shown in FIG. 8, the host computer need only be connected to an electronic mailing system 10 such that the messages from the host computer are transmitted according to the priority level.

In addition, in the embodiment above, although the manager's terminal 2*a* is disposed separately from the other terminals 2*l*, 2*m*, and 2*n* either one of the terminals 2*l*, 2*m*, and 2*n* may also develop the function of the terminal 2*a*.

In the embodiment above, although the electronic slip processing system is operated through a host computer, the present invention is naturally also applicable to an electronic slip processing system in which the mailing operation is effected without using the host computer and to a system employing, for example, a local area network (LAN).

Figure 9:
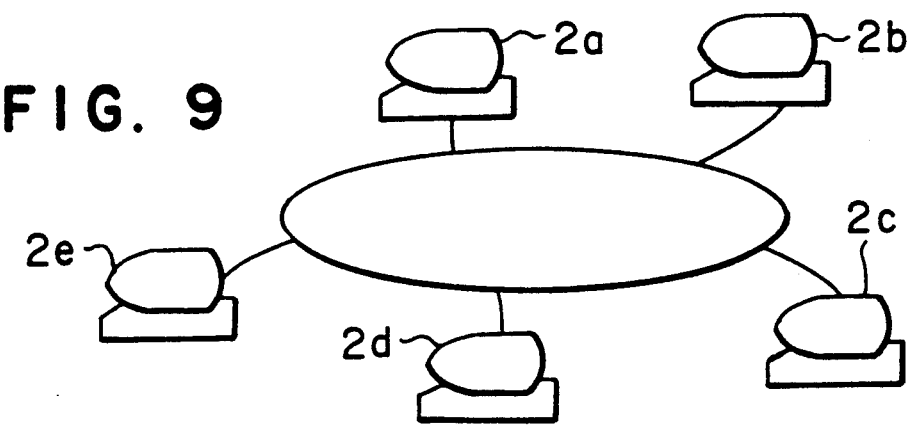

That is, for this purpose, as shown in FIG. 9, for example, a plurality of terminals 2*a* to 2*e* need only be connected through communication lines arranged in a ring form such that the terminal 2*b* is provided with the function of the host computer of the embodiment above.

As described above, according to the present invention, as compared with the operation in the slip processing of the prior art utilizing paper, the operability and the reliability can be increased; moreover, since a message requesting or allowing the next division waiting for a data registration to register data is automatically outputted, the slip processing can be achieved without any delay or stagnation.

In addition, simple jobs such as the data transcription, operations to generate the total amount, and the validation of data items which are manually carried out in the conventional system are effected by the system; in consequence, the job efficiency is improved, namely, the period of time for the intellectual work is increased.

Furthermore, it is to be understood that the present invention is applicable, in addition to the slip, to any other data display formats.

We claim:

1. A data distribution system with destination storage of display format comprising:
   a data processor having a memory for storing a plurality of processor data display formats and a corresponding data field associated with each said format, and means for receiving a data request, selecting from among said data formats in accordance with said data request and outputting the contents a data field, among said data fields, with an associated one of said processor data display formats which corresponds to said data request;

a first terminal having means for entering said at least one of said plurality of processor data display formats into said data processor; and means, associated with said data processor and said first terminal, for loading at least one of said plurality of processor display formats into at least one of a plurality of second terminals operatively connected to said data processor, at least one of said second terminals having:

(i) a memory means for storing said loaded data display formats, (ii) means for inputting a format request having means for selecting from among said loaded data display formats, (iii) means for establishing and sending a value of said data request, in accordance with said selected loaded data format, to said data processor, (iv) means for receiving from said data processor the contents of the data processor data field associated with the data processor data format selected by said data processor in accordance with the value of said data request, (v) means for arranging and displaying said contents of said data field according to the one of said loaded display formats selected from said second terminal memory, (vi) said for inputting having means for inputting a data to selectively modify the content of said data field, and (vii) means for sending the content of the modified data field to said data processor.

2. A system according to claim 1 wherein said data processor separately stores, for each data display format, in a cumulative fashion data inputted and sent from each said second terminal in said first memory.

3. A system according to claim 1 wherein each said second terminal stores only the data display formats related thereto in the second memory associated thereto.

4. A system according to claim 1 wherein together with the data field only an identifier indicating a data display format related to the data field is transmitted between said data processor and each said second terminal.

5. A system according to claim 1 wherein either one of said plural second terminals functions as said first terminal.

6. A system according to claim 1 wherein said data processor delivers the data display format stored in said first memory only to said second terminals specified by said first terminal.

7. A system according to claim 1 wherein said data processor has means for notifying any one from among said second terminals of a state indicative of a selective subsequent transfer from said data processor memory to said one second terminal of said data field.

8. A system according to claim 1 wherein at least one said second terminal has means for selectively sending an approval message corresponding to a content of said data field displayed thereon to said data processor and said data processor has means for storing said message in said data processor memory.

9. A system according to claim 1 wherein at least one second terminal has means for instructing said data processor to effect a print processing according to a specified one of said loaded data display formats, and said data processor has means for reading a data field related to said specified format from among said data fields stored in said data processor memory and sending the read data field to any of said second terminals, and wherein the second terminal which receives said read data field has means to read, from among its said plurality of stored loaded data display formats, a data display format corresponding to said specified display format and effect a print operation of said read data in accordance with said read data display format.

10. A system according to claim 8 wherein said approval message includes information indicating an approved format and an identification of the approving second terminal, said memory of said data processor has means for storing a proof mark data designating an approval instruction for the memory of each said second terminal, and said data processor has means for including with a data field from among said data fields a corresponding one from among said proof mark data such that when said second terminal instructs a print processing to said data processor with said specified data display format, said data processor reads from its said memory a data related to said specified format from among said data fields and a corresponding proof mark data designating a terminal from among said second terminals which is associated with the approval of said read data and then sends said read data and said corresponding proof mark data to one from among said second terminals, and said second terminal has means to read a data display format from its said memory corresponding to said specified display format and to effect printing of said read data in accordance with said data display format read from said second terminal memory.

11. A distributed data processing method in a distributed data processing system including a data processor having a processor memory for storing a plurality of data display formats, each said data display format having a corresponding format identifier and having a data entity to be placed on the data display format, the distributed data system further including a first terminal, a plurality of second terminals each having a terminal memory means for storing a plurality of data display formats, comprising the steps of:

establishing a data display format from said first terminal;

delivering said data display format to said data processor and storing said data display format in said data processor memory;

delivering said data display format from said data processor to at least one from among said second terminals and storing said data display format in the terminal memory thereof;

selecting, from the memory of any among said second terminals, a data display format;

issuing from said second terminal, in response to said selection, a request having a value corresponding to said selected format, to said data processor;

identifying if the value of said request corresponds to any from among said format identifiers;

reading from the data processor memory, in response to the value of said request corresponding to any among said format identifiers, the data entity placed on the identified format;

sending said data entity to said second terminal issuing the request;

combining, in said second terminal issuing the request, the data transmitted from said data processor and the specified data display format selected and read from the memory of said second terminal, and displaying a combined image thereof on said second terminal; and inputting data, based on the display in said second terminal issuing the request;

sending the input data to said data processor; and storing the input data in said data processor memory.

12. A method according to claim 11 wherein said inputting step, said data processor separately stores, for each data display format, data inputted and sent from each said second terminal in said first memory in a cumulative fashion.

13. A method according to claim 11 wherein each said second terminal stores only the data display formats related thereto in the second memory associated thereto.

14. A method according to claim 11 wherein together with the data, only an identifier indicating a data display format related to the data entity is transmitted between said data processor and each said second terminal.

15. A method according to claim 11 wherein either one of said plural second terminals functions as said first terminal.

16. A lob distribution processing method according to claim 11 wherein said data processor delivers the data display format stored in said first memory only to said second terminals specified by said first terminal.

17. A method according to claim 11 wherein when the data inputted from the second terminal is completely stored in said first memory of said data processor, said data processor sends a message notifying the possibility of a data transmission thereto to either one of said second terminals which is subsequently to send input data to said data processor.

* * * * *